April 13, 1926.

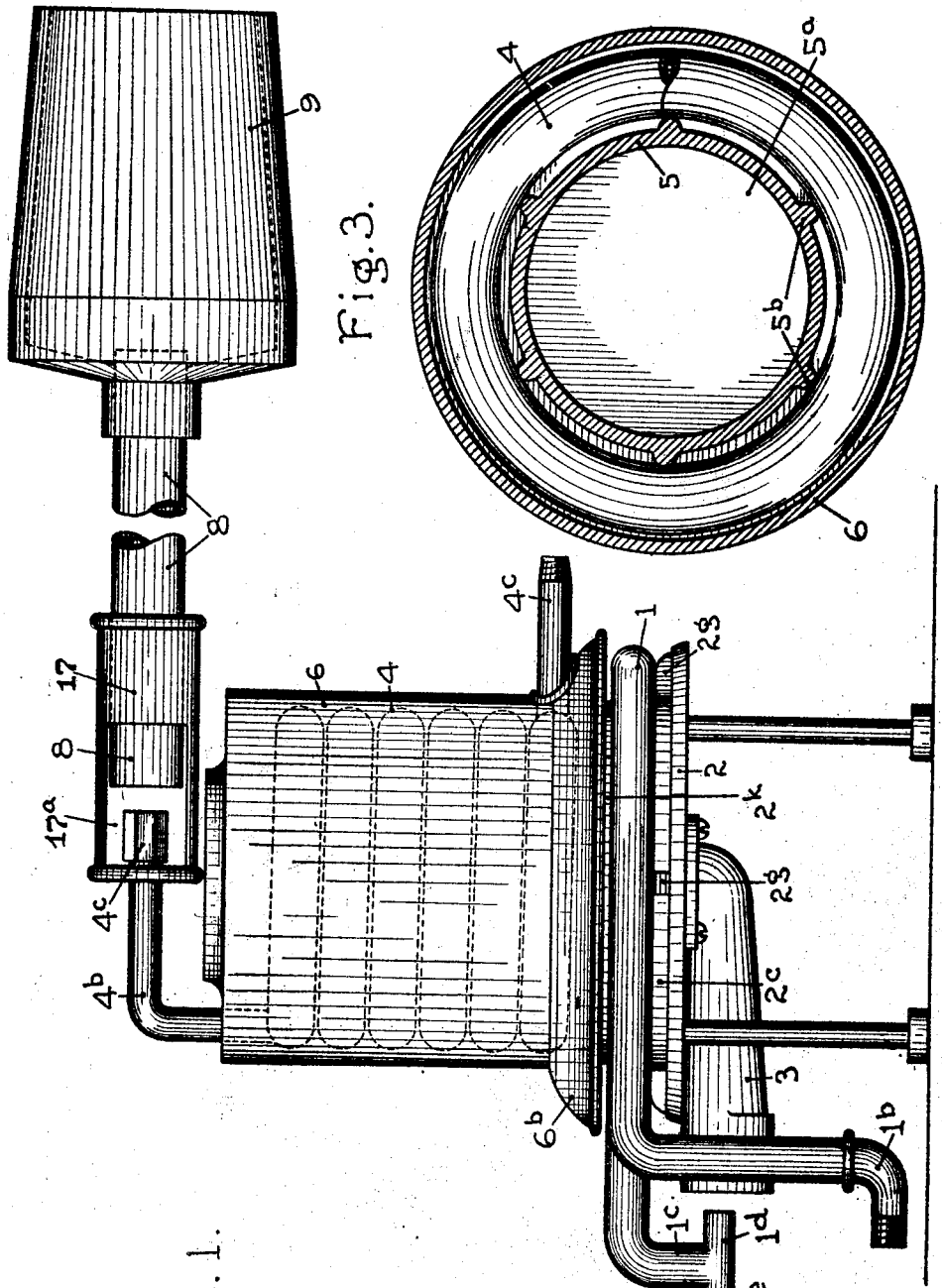

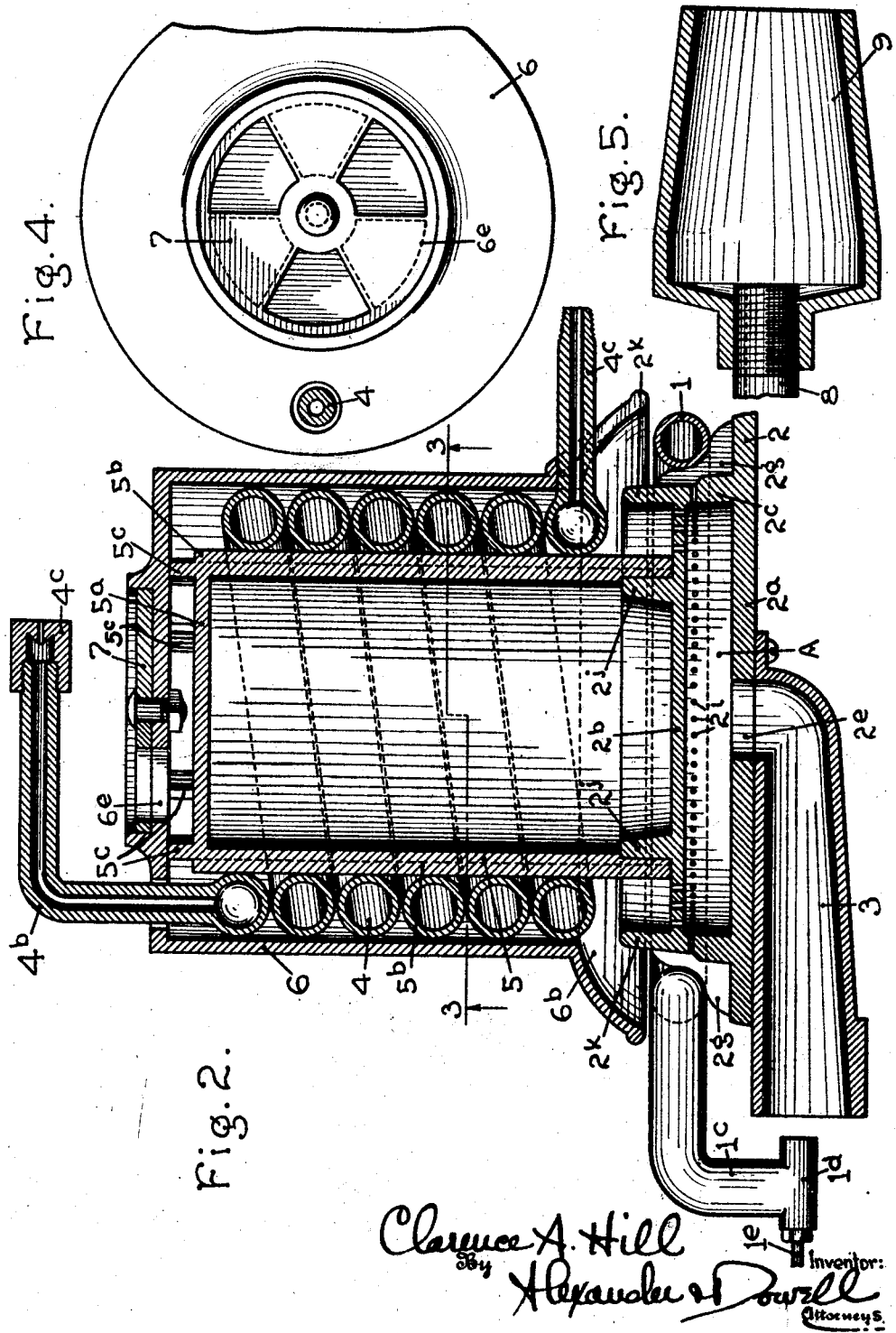

C. A. HILL 1,580,892

HYDROCARBON GAS GENERATING AND BURNING APPARATUS

Filed Oct. 8, 1923    3 Sheets-Sheet 3

Inventor
Clarence A. Hill
By Alexander D. Powell
Attorneys

Patented Apr. 13, 1926.

1,580,892

UNITED STATES PATENT OFFICE.

CLARENCE A. HILL, OF FORT WAYNE, INDIANA.

HYDROCARBON GAS GENERATING AND BURNING APPARATUS.

Application filed October 8, 1923. Serial No. 667,332.

*To all whom it may concern:*

Be it known that I, CLARENCE A. HILL, a citizen of the United States, residing at Fort Wayne, in the county of Allen and State of Indiana, have invented certain new and useful Improvements in Hydrocarbon Gas Generating and Burning Apparatus; and I hereby declare that the following is a full, clear, and exact description thereof, reference being had to the accompanying drawings, which form part of this specification.

This invention is a novel apparatus for converting heavy hydro-carbons into gas and burning same, and is utilizable for many purposes in the art.

The principal object of the invention is to provide an apparatus wherein approximately perfect generation and combustion of the gas can be obtained without the employments of baffles, which have heretofore been considered necessary in order to insure combustion of the gases. Another object is to provide a novel sub-generator which is used to provide the gases which are used for heating the primary or main generator, and is also capable for general use as a heater. Another object of the invention is to provide an apparatus wherein the sub-generator has an independent feed which can be adjusted to produce the desired amount of heat when the primary or main generator is not being used, and hence enhances the flexibility of the apparatus in the generation of gases and heat. A further object of the invention is to provide a novel terminal or head for the primary or main generator whereby, if desired, the gas can be discharged in a burning flame resembling that from a torch, without the necessity of using a baffle.

A still further object of the invention is to provide a novel generator apparatus whereby more or less gas can be produced at will or as desired without danger of the apparatus "going out"; and whereby the amount of gas produced can be greatly varied, according to the uses as desired, thus greater enhancing the utility of the generator.

I will explain the invention with reference to the accompanying drawings which illustrate one practical embodiment of the apparatus and will explain the same with reference thereto, and summarize in the claims the novel features of construction, and novel combinations of parts, for all of which protection is desired.

In said drawings:

Fig. 1 is a side elevation of the complete apparatus.

Fig. 2 is a vertical sectional view thereof.

Fig. 3 is a detail section view on the line 3—3, Fig. 2.

Fig. 4 is a detail top plan view of the apparatus.

Fig. 5 is a detail sectional view of the combustion head.

The sub-generator comprises a generating coil 1 and a hollow member 2, preferably a casting and preferably circular in form, having a bottom plate $2^a$, a top plate $2^b$ and sides $2^c$ enclosing a gas distributing space or chamber A to which a combustible gas and air mixture is admitted through a pipe 3 bolted to the under side of the plate $2^a$ and communicating with an opening $2^f$ in said plate. Exterior to the walls $2^c$ are radially disposed webs $2^g$ on which the sub-generator coil is supported.

The sub-generator coil 1 surrounds the chamber A, and a series of apertures $2^i$ are formed in the wall $2^c$ adjacent the coil 1, and said coil 1 is heated by the burning gases issuing from said apertures $2^i$. The coil 1 has one end bent downward adjacent the outer end of the pipe 3, and provided with a nipple $1^b$ to which may be attached any suitable oil supply pipe through which coil may be supplied to the coil 1, as desired, and in regulated quantity.

The other end of the coil 1 has a depending portion $1^c$ terminating in a jet head $1^d$ which is directly opposite the outer open end of the pipe 3 and is preferably provided with a jet regulating screw $1^e$, in the usual manner. By this head $1^d$ the gases generated in the coil 1 will be directly discharged into the pipe 3, mixed with air and conducted into the chamber A, and will escape through the apertures $2^i$ to heat the coil 1 as above explained.

The major portion of the gas escapes from chamber A through jet apertures $2^e$ in the top plate $2^b$. From the top of plate $2^b$, exterior to the apertures $2^e$ extends an annular flange on ridge $2^k$ and from the top of said plate, at the inner side of the perforations $2^e$ extends a similar annular flange $2^j$.

Figure 6:
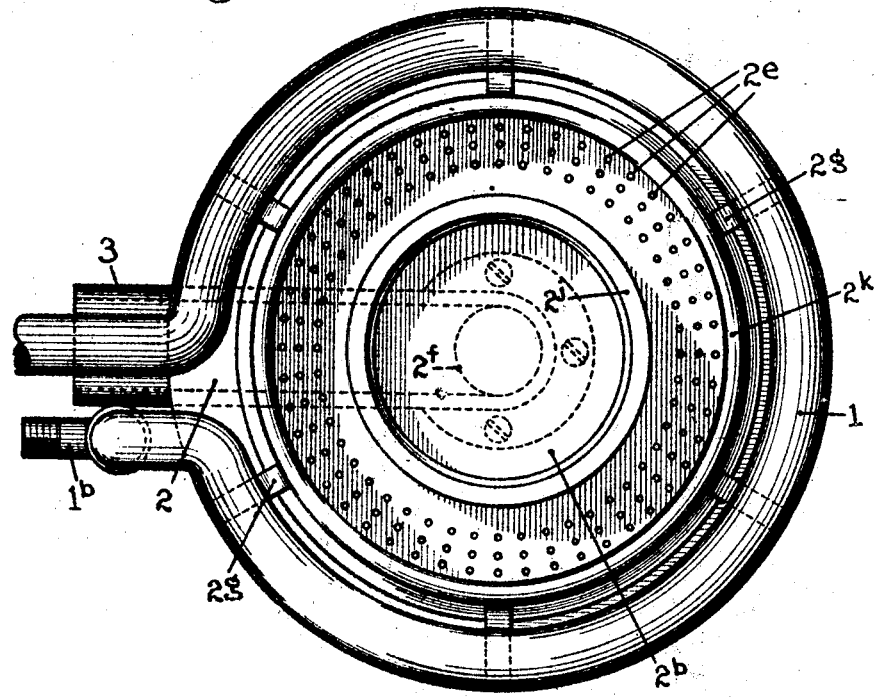
Fig. 6 is a top plan view of the sub-generator.
Figure 7:
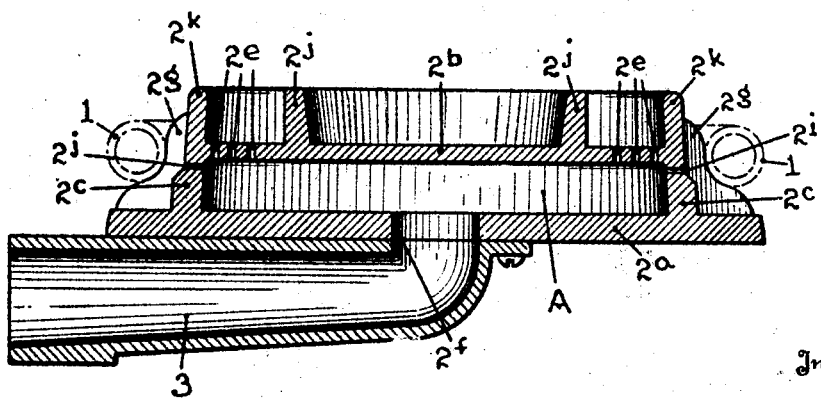
Fig. 7 is a detail sectional view of Fig. 6.

These flanges $2^j$ and $2^k$ are of great utility, and insure the burning of the gases escaping from the jet apertures $2^e$. Without these flanges the gases would not burn if the sub-generator was used alone, as in Fig. 7, but by having these flanges the gases will ignite and burn as they should even if the primary generator is not present.

Just why the gases will not burn when the flanges are not present (unless the jets are baffled) I do not know, but probably air rushes in from the sides and dilutes or carries away the gases and cools them off before they can ignite. This fact has caused great difficulty, with, and the failure of, many burner-generators. I have had much experience with hydro-carbon gas generators, and finally discovered these facts; and by the use of such flanges ignition is insured and the sub-generator can be used as a burner or heater apart from the other portions of the apparatus, but its principal use in the apparatus is to heat the primary or main generator coils to generate large quantities of gas.

The primary or main generator, comprises a coil 4 which is mounted upon the sub-generator as indicated in the drawings. As shown, the coil 4 has a number of spiral coils, approximately corresponding in diameter to the width of the annular space between the ribs or flanges $2^j$ and $2^k$ of the casting 2.

The coil 4 is positioned over the sub-generator by means of a coil-cylinder 5 which is preferably slightly larger in interior diameter than the exterior diameter of the flange $2^j$, and its lower end telescopes said flange, and is supported upon the plate $2^b$ as shown. The upper end of cylinder 5 is preferably closed, as at $5^a$. This cylinder is provided with a series of vertical ribs or flanges $5^b$ which space the primary coils 4 away from the outer wall of the cylinder 5.

The primary coil 4 is enclosed by a jacket 6, which is preferably cylindrical and is open at bottom, but closed at top. This jacket 6 is supported upon the top of the cylinder 5 and is spaced from the plate $5^a$ by means of a plurality of lugs $5^c$ mounted on the top of the plate $5^a$ as shown in Fig. 2.

The jacket 6 preferably has an outwardly and downwardly projecting flange $6^b$ at its bottom which extends over the top of the sub-generator coil 1 and is adapted to catch the heated gases of combustion rising from the jets $2^i$ and direct same into the space between the cylinder 5 and jacket 6, thereby conserving such heat.

Openings $6^a$ may be formed in the top $6^a$ of the jacket, which openings may be closed by a damper 7 as indicated in Figs. 2 and 4.

The lower end of the primary coil 4 projects out of the jacket through an opening in the flange $6^b$, as shown, and terminates in a nipple $4^e$ to which may be connected any suitable supply pipe by which hydrocarbons can be supplied to the coil in suitable regulated quantity.

The upper end of the coil 4 extends through an opening in the top plate of the jacket 6 and is preferably bent as at $4^b$ and has a jet head $4^c$ on its extremity through which the gas is directed into a gas conducting pipe 8.

The jet head $4^c$ and the adjacent end of the gas conducting pipe 8 enter opposite ends of a combined pipe guide and air mixer 17, which supports the jet head $4^c$ and adjacent end of the pipe 8 in alignment and said mixer 17 is provided with openings $17^a$ in its sides to admit air between the jet head and the end of pipe 8, and also to permit adjustment of the jet head $4^c$ or pipe $4^b$.

Pipe 8 forms a gas conducting pipe and mixing chamber in which the gas and air mix as they pass onward to the point of utilization, which may be of any desired kind. In the example shown the gases are discharged from pipe 8 into a combustion head 9, as shown in Figs. 1 and 5 which is substantially a tapered cylinder, open at its smaller end and closed at its larger end which is connected to pipe 8 as shown. By means of this combustion head 9 the gas generated in the coil 4 can be burned in the open, like a gigantic torch, without the necessity of using a baffle.

The sub-generator coil 1 almost entirely encircles the generator body, and the gas generated therein is directed by pipe 3 into the chamber A, wherein it is distributed to the jet apertures $2^i$ to heat coil 1, and to the jet apertures $2^e$ for general utility.

I call special attention to the upstanding flanges $2^j$ and $2^k$. Heretofore, if holes were made in top of a generator, unless baffled, the escaping gas would not burn, but would lift away and go out. The air seemed to rush in before combustion could take place and carry the gases away. These flanges $2^j$ and $2^k$ however prevent such, and I get perfect combustion without any baffle. These flanges are important for many prior burners have failed for lack of such flanges. The sub-generator and burner can be used in many ways, as an independent unit as well as in combination with the primary generator.

The primary generator coil 4 surrounds the coil cylinder 5 whose function is merely to hold the coil 4 in place. Its ribs $5^b$ keep the coil 4 away from the cylinder walls so that heat can travel freely upward. The heat travels up around said coil 4, and passes between cylinder top and jacket top, and escapes through the openings 6e by regulating the damper 7.

When gas is generated in this primary coil 4, it passes out of tip 4c into conductor 8, and may be directed to a furnace, or other apparatus where it is baffled to obtain the combustion unless my special combustion chamber 9 is employed. Hydro-carbon gases have heretofore been considered to require a baffle to insure their combustion, but by use of my combustion chamber 9, I can burn the gases in the open, like a gigantic torch, obtaining better combustion, and producing more heat than without it.

I can get far more flexibility with this generator than with so called "automatic" generators as far as generating heat is concerned. In such "automatic" generators it is necessary to shut off the oil to reduce the amount of gas, and this reduces the amount of gas going to the generator in same proportion. In my new apparatus the sub-generator has an independent oil feed and therefore can burn just as briskly and produce just as much heat whether the primary coil is producing gas or not, hence a small amount of gas generated through the primary coils could be the same high quality as larger amounts, because the generating heat in that coil is kept up by the independent sub-generator. Therefore, for work requiring flexibility of heat my new generating and burning apparatus excels others in which the primary generator has to go "full tilt" or not at all, so that in many lines such apparatus could not be used because the heat could not be properly regulated. Whereas in my present invention these objections and defects are overcome.

I claim:

1. In apparatus of the character specified, a burner consisting of a casing having a substantially closed interior chamber, a series of jet apertures in its top wall communicating with said chamber, and parallel flanges on its top wall respectively disposed at opposite sides of the jet apertures whereby combustion is localized; and means for supplying a mixture of gas and air to said chamber.

2. In apparatus of the character specified a generator comprising a member having an internal chamber, a series of jet apertures in its walls communicating with the chamber, and parallel flanges exterior to the chamber and at opposite sides of the series of jet apertures whereby combustion is localized, said member having a second series of jet apertures, and a generating coil exterior to said chamber adapted to be heated by the gases issuing from second series of jet apertures and to supply gases to said chamber.

3. In apparatus of the character specified, a sub-generator comprising a hollow member provided with a chamber and two sets of apertures from said chamber, and parallel flanges exterior to the chamber and on opposite sides of one set of jet apertures whereby combustion is localized, and a generator exterior to said chamber adapted to be heated by the gases issuing from the other set of apertures; the said generator discharging gases into said chamber.

4. In apparatus of the character specified a hollow member provided with a chamber and sets of jet apertures; and parallel flanges exterior to the chamber and on opposite sides of the jet apertures whereby combustion is localized, and a sub-generator discharging into said chamber, with a primary generator supported above the chamber and adapted to be heated by the gases discharged therefrom.

5. In combination with apparatus as set forth in claim 4, independent oil supplies to the sub-generator and to the primary coil.

6. In apparatus of the character specified a hollow member provided with a chamber, parallel ridges exterior to the chamber and on opposite sides of jet apertures therein whereby combustion is localized, and a sub-generator exterior to said chamber adapted to be heated by the gases issuing therefrom and to discharge generated gases into said chamber, with a primary generator above the jet apertures and adapted to be heated by the gases discharged therefrom; and independent oil supplies to the sub-generator and to the primary generator.

7. In apparatus of the character specified a hollow member provided with a chamber and sets of jet apertures; and parallel flanges exterior to the chamber and on opposite sides of the jet apertures whereby combustion is localized; and a sub-generator discharging into said chamber, with a primary generator supported above the said apertures adapted to be heated by the gases discharged therefrom, and independent oil supplies to the sub-generator and to the primary generator.

8. In apparatus of the character specified a sub-generator comprising a hollow member provided with a chamber and two sets of apertures from said chamber, and parallel flanges exterior to the chamber and on opposite sides of one set of jet apertures whereby combustion is localized, and a pipe exterior to said chamber opposite the other set of aperatures and adapted to be heated by the gases issuing therefrom and discharge gases into said chamber.

9. In apparatus of the character specified, a sub-generator comprising a hollow member provided with a chamber and two sets of apertures from said chamber, and parallel flanges exterior to the chamber and on opposite sides of one set of jet apertures whereby combustion is localized, and a pipe exterior to said chamber opposite the other set of apertures and adapted to be heated by the gases issuing therefrom and discharge gases into said chamber; a primary coil adapted to be heated by the gases discharged from the apertures intermediate the parallel flanges; means for supplying hydrocarbon oil to said sub-generator; and means for supplying oil to the primary coil.

10. In apparatus of the character specified a generator comprising a member having an internal chamber, an inlet to said chamber; two series of jet apertures in its walls communicating with said chamber, and parallel flanges exterior to the chamber and on opposite sides of one series of jet apertures; a pipe coil exterior to said chamber and adapted to be heated by the gases discharged from the other series of apertures; a jet head on the discharge end of said coil; and a pipe for conducting the gases discharged from said jet head into said chamber.

11. In apparatus of the character specified a sub-generator comprising a hollow member provided with a chamber, an inlet to said chamber, and two sets of jet apertures, and parallel flanges exterior to the chamber and on opposite sides of one set of jet apertures whereby combustion is localized; and a pipe coil exterior to said chamber and opposite the other set of apertures and adapted to be heated by the gases discharged therefrom; a jet head on the discharge end of said coil, and a pipe for conducting the gases discharged from said jet head into said chamber; with a primary coil supported above one set of apertures and adapted to be heated by the gases discharged therefrom.

12. In combination with apparatus as set forth in claim 11 means for supplying hydro-carbon oil to said sub-generator, and means for supplying oil to the primary coil.

13. In apparatus of the character specified a sub-generator comprising a hollow member provided with a chamber, an inlet to said chamber, and two sets of jet apertures, and parallel flanges exterior to the chamber and on opposite sides of one set of jet apertures; a pipe coil exterior to said chamber and opposite the other set of jet apertures and adapted to be heated by the gases discharged therefrom; a jet head on the discharge end of said coil, and a pipe for conducting the gases discharged from said jet head into said chamber; with a primary generator supported above the said flanges adapted to be heated by the gases discharged from the apertures intermediate said flanges; and independent oil supplies to the sub-generator and to the primary generator.

14. In apparatus of the character specified, a sub-generator comprising a hollow member provided with a chamber, an inlet to said chamber, and two sets of jet apertures, and a pipe coil exterior to said chamber and opposite one set of said apertures and adapted to be heated by the gases discharged from said jets; a jet head on the discharge end of said coil, and a pipe for conducting the gases discharged from said jet head into said chamber, and parallel flanges exterior to the chamber and on opposite sides of the other set of jet apertures whereby combustion is localized, and with a primary generator coil mounted on the sub-generator and heated by the gases issuing from the second set of apertures, and independent means for supplying hydro-carbon oil to said primary coil and to the sub-generator.

15. In apparatus of the character specified a sub-generator comprising a hollow member provided with a chamber, an inlet to said chamber, and two sets of jet apertures, and a pipe coil exterior to said chamber and opposite one set of said apertures and adapted to be heated by the gases discharged from said jets; a jet head on the discharge end of said coil, a pipe for conducting the gases discharged from said jet head into said chamber; with a primary generator coil mounted on the sub-generator and heated by the gases issuing from the second set of apertures, a primary coil cylinder for positioning said primary coil on the sub-generator, and a coil-jacket exterior to the primary coil and surrounding the coil and cylinder.

16. In apparatus of the character specified a sub-generator comprising a hollow member provided with a chamber, an inlet to said chamber, and two sets of jet apertures, and a pipe coil exterior to said chamber and opposite one set of said apertures and adapted to be heated by the gases discharged therefrom; a jet head on the discharge end of said coil, for discharging gases generated therein into the said chamber, and parallel flanges exterior to the chamber and on opposite sides of the other set of jet apertures whereby combustion is localized; with a primary generator coil mounted on the sub-generator and heated by the gases issuing from the second set of apertures, a primary coil cylinder for positioning said primary coils on the sub-generator, and a coil-jacket exterior to the primary coil and surrounding the coil and cylinder.

17. In combination with apparatus as set forth in claim 16, means for supplying hydro-carbon oil to said sub-generator, and means for supplying oil to the primary coil.

18. In an apparatus of the character specified a hollow member provided with a chamber and sets of jet apertures, and ridges exterior to the chamber and at opposite sides of one set of jet apertures whereby combustion is localized; a generator exterior to said chamber; and adapted to be heated by the gases discharged therefrom and a torch head combustion chamber connected with the discharge end of the generator adapted to burn gases in the open.

19. In apparatus specified a hollow member provided with a chamber and sets of jet apertures, and ridges exterior to the chamber and at opposite sides of one set of jet apertures, whereby combustion is localized; a subgenerator discharging into said chamber; a primary generator, a gas and air mixer connected with the discharge end of the primary generator, and a torch head combustion chamber connected with the said mixer and adapted to burn gases in the open.

20. In apparatus of the character specified a hollow member provided with a chamber and ridges exterior to the chamber and at opposite sides of the jet apertures therein, whereby combustion is localized; a primary generator, a sub-generator exterior to said chamber adapted to be heated by the gases issuing therefrom and to discharge generated gases into said chamber; and a torch head combustion chamber connected with the discharge end of the primary generator and adapted to burn gases in the open.

21. In apparatus of the character specified a hollow member provided with a chamber and sets of jet apertures, and parallel flanges exterior to the chamber and on opposite sides of the jet apertures, whereby combustion is localized; a sub-generator discharging into said chamber; and a primary generator supported above the chamber and adapted to be heated by the gases discharged therefrom.

22. In an apparatus of the character specified a hollow member provided with a chamber and sets of jet apertures and parallel flanges exterior to the chamber and on opposite sides of the jet apertures, whereby combustion is localized; a sub-generator discharging into said chamber; a primary generator supported above the chamber and adapted to be heated by the gases discharged therefrom; means for supplying oil to the sub-generator; means for supplying oil to the primary generator independently of the sub-generator; and a torch head combustion chamber connected with the discharge end of the primary generator and adapted to burn gases in the open.

23. In apparatus of the character specified a hollow member provided with a chamber and sets of jet apertures; parallel flanges exterior to the chamber and on opposite sides of the jet apertures, whereby combustion is localized; a sub-generator discharging into said chamber; a primary generator supported above the chamber and adapted to be heated by the gases discharged therefrom; means for supplying oil to the primary generator and to the sub-generator; and a combustion chamber comprising a hollow cylindric body open at one end having an opening in other end for the admission of gases connected with the discharge end of the primary.

In testimony that I claim the foregoing as my own, I affix my signature.

CLARENCE A. HILL.